June 30, 1931.  J. A. HEALY  1,812,530
DRINKING FOUNTAIN FOR POULTRY
Filed July 21, 1926   2 Sheets-Sheet 2
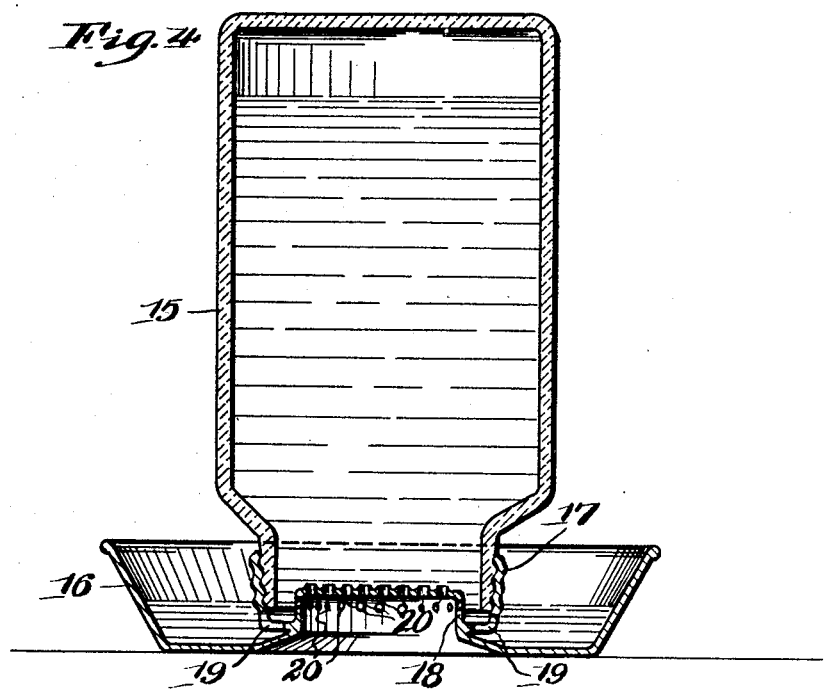
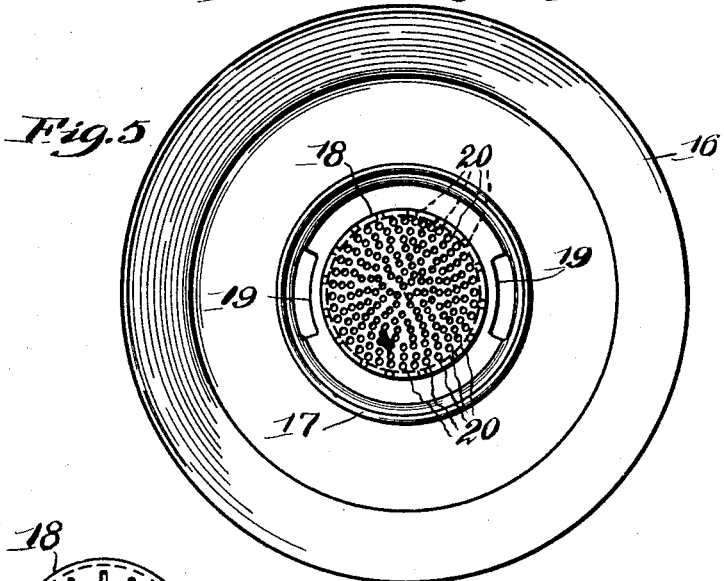
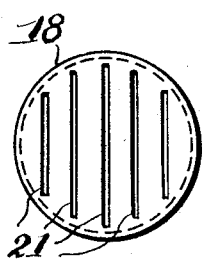
Inventor
John A. Healy
By Stryker & Stryker
Attorneys Patented June 30, 1931

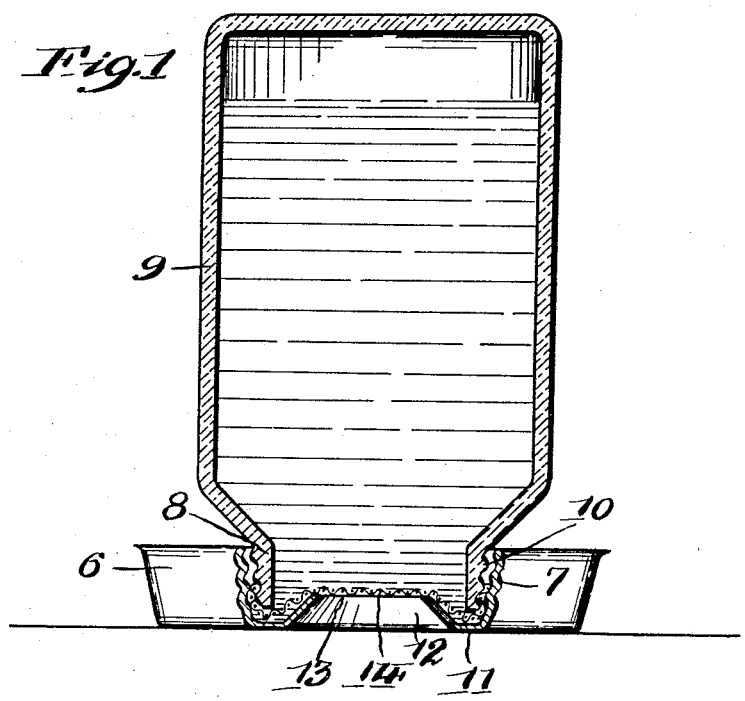
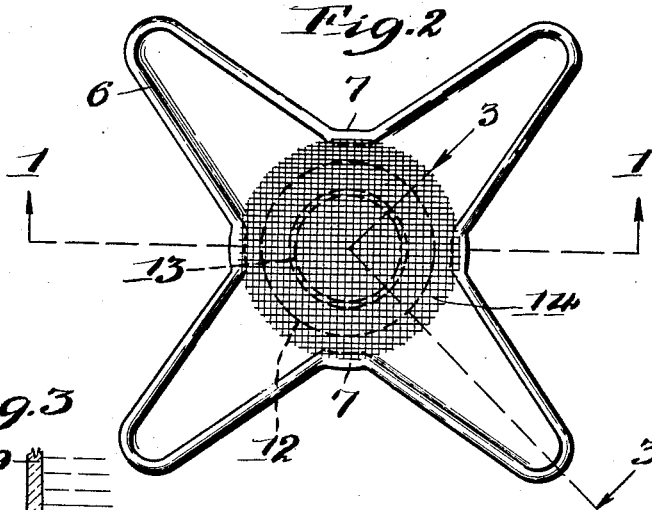
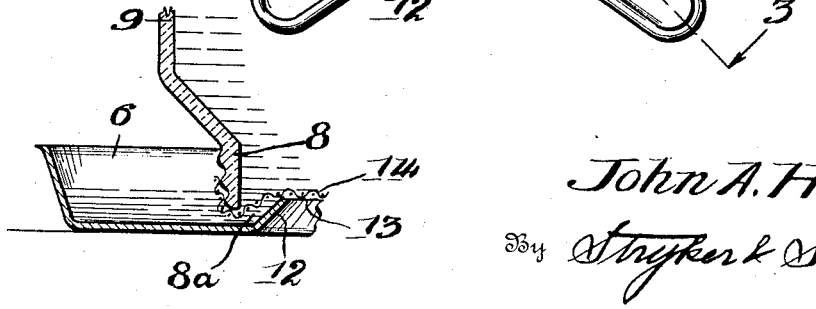

1,812,530

UNITED STATES PATENT OFFICE

JOHN A. HEALY, OF LANGDON, MINNESOTA

DRINKING FOUNTAIN FOR POULTRY

Application filed July 21, 1926. Serial No. 123,896.

It is my object to facilitate the work of refilling poultry drinking fountains, and at the same time to minimize the cost of such devices by providing a continuously open filling passageway therefor in combination with a foraminous guard for said passageway adapted to prevent the escape of water.

The invention will be best understood by reference to the accompanying drawings in which Figure 1 is a central, vertical section through the preferred form of my device, the section through the trough being taken on the line 1—1 of Fig. 2; Fig. 2 is a plan view of the trough with the reservoir removed; Fig. 3 is a fragmentary section taken on the line 3—3 of Fig. 2; Fig. 4 is a central, vertical section through an alternate form of my device; Fig. 5 is a plan view of the trough for the alternate form shown in Fig. 4 and Fig. 6 is a plan view showing another form of filling neck.

In the preferred form of my device, the trough 6 is formed from a single, integral piece of sheet metal stamped to the desired shape. The trough 6 is thus formed like a shallow pan having re-entrant portions 7, adapted to engage the neck 8 on a reservoir 9. Any of a number of standard preserve jars may be utilized as a reservoir, that illustrated being of the type known as a Mason jar. The reservoir when in use is positioned with its open end downward, and preferably has threads or other suitable projections 10 on the neck 8, adapted to engage similarly formed projections or threads on the re-entrant portions 7 of the trough. These re-entrant portions 7 converge downward, so that the neck 8, when inserted therein, is spaced from the bottom 11 of the reservoir and permits flow of water from the reservoir into the trough through an opening 8a, as shown in Fig. 3.

A filling neck or passageway 12 is formed centrally in the bottom 11 and is provided at its upper extremity with an opening 13 through which the water may be poured into the reservoir 9, when inverted as hereinafter described. In Fig. 1 the space between the neck 8 and re-entrant portions 7 of the trough is exaggerated for clearness. The normally upper extremity of the filling passageway 12 is covered by a small mesh screen or other suitable foraminous member 14. To adapt this member 14 to be held in place over the opening 13, it is made large enough to extend laterally at the sides, between the neck 8 on the reservoir and the re-entrant portions 7 of the trough. When the trough is attached to the reservoir, the margins of the member 14 are gripped between the neck 8 and portions 7 of the trough. The member 14 is drawn tight over the opening 13, as the neck 8 is screwed or pressed into the trough. It will be noted that the foraminous member 14 is offset upward into the trough from the bottom 11.

In use, with the reservoir, trough and foraminous member 14 assembled as shown in Fig. 1, the drinking fountain may be inverted and the reservoir filled by pouring water through the passageway 12. The water passes freely through the member 14 during the filling. Now when the fountain is placed upright and supported upon the bottom 11, water will flow into the trough through the opening 8a until it reaches the level of the lower extremity of the neck 8. Further flow of water into the reservoir is prevented by the atmospheric pressure upon the exposed surface of water. Escape of water from the reservoir through the opening 13 is prevented by the member 14 to which the water adheres, forming therewith an effective seal against outward but not inward flow.

In the alternate form of my device, shown in Figs. 4 and 5, the reservoir 15 is similar to that shown in the preferred form, but the trough 16 is circular and provided with a cup-shaped member 17, secured in concentric position in the trough and adapted to be threaded upon the neck of the reservoir. This member 17 is spaced from the bottom of the trough 16, being rigidly supported upon the outer periphery of a filling passageway 18. Openings 19 in the bottom of the cup 17 permit passage of water from the reservoir into the trough. The normally upper end of the filling passageway 18 has a multiplicity of perforations 20, adapted to permit flow of water into the reservoir. These openings 20, like the interstices in the member 14 of the preferred construction, are small enough to prevent the escape of water from the reservoir 15 when in use. In the form of filling neck shown in Fig. 6, a series of narrow and relatively long slots are formed in the otherwise closed depression in the bottom of the trough. To effectively retain the water, the openings in the filling passageway should not greatly exceed about one-eighth of an inch in diameter, or, in the form shown in Fig. 6, should be somewhat less than an eighth of an inch in width.

It will be seen that my device has the advantage of being inexpensive and avoids the usual separation of the reservoir and trough each time the reservoir is to be filled. Further, there are no loose or removable parts requiring handling or which are apt to become misplaced or lost, as with drinking fountains having removable closures for the filling opening.

Having described my invention what I claim as new and desire to protect by Letters Patent is:

In a drinking fountain, the combination with a reservoir and a trough adapted to be supplied with water from said reservoir, said trough being formed with a filling opening in its base and a fine mesh screen extending across said opening and adapted to prevent the escape of water from said reservoir when the fountain is in use, said screen being offset upward from the base of said trough and the fountain being adapted to be inverted for filling through said opening and screen.

In testimony whereof, I have hereunto signed my name to this specification.

JOHN A. HEALY.